US012668118B2

(12) United States Patent
Ali et al.

(10) Patent No.:     US 12,668,118 B2
(45) Date of Patent:         Jun. 30, 2026

(54) AIR SUPPLYING SYSTEM FOR MOTOR VEHICLES, AND MOTOR VEHICLE, IN PARTICULAR A TRUCK, COMPRISING SUCH AIR SUPPLYING SYSTEM

(71) Applicant: Volvo Truck Corporation, Gothenburg (SE)

(72) Inventors: Rifat Fahmida Ali, Kolkata (IN); Muthukumar Venkitachalam, Thiruvananthapuram (IN)

(73) Assignee: Volvo Truck Corporation, Gothenburg (SE)

( * ) Notice: Subject to any disclaimer, the term of this patent is extended or adjusted under 35 U.S.C. 154(b) by 587 days.

(21) Appl. No.: 18/296,152

(22) Filed: Apr. 5, 2023

(65) Prior Publication Data

US 2023/0331078 A1     Oct. 19, 2023

(30) Foreign Application Priority Data

Apr. 13, 2022    (EP) ..................................... 22168249

(51) Int. Cl.
*B60K 11/08*                (2006.01)
(52) U.S. Cl.
CPC .................................... *B60K 11/08* (2013.01)
(58) Field of Classification Search
CPC ................................ B60K 11/08; B60K 11/04
See application file for complete search history.

(56) References Cited

U.S. PATENT DOCUMENTS

| | | | |
|---|---|---|---|
| 2,912,057 A | 11/1959 | Wagner | |
| 3,165,164 A | 1/1965 | Hostetler et al. | |
| 6,298,908 B1 * | 10/2001 | Harrell | B60H 1/00521 |
| | | | 277/944 |
| 6,457,543 B1 * | 10/2002 | Wooldridge | B60K 11/04 |
| | | | 49/492.1 |
| 6,622,808 B2 * | 9/2003 | Sasano | B60K 11/04 |
| | | | 180/68.6 |

(Continued)

FOREIGN PATENT DOCUMENTS

DE        102020114756 A1    12/2021

OTHER PUBLICATIONS

European Search Report for European Patent Application No. 22168249.5, completed Sep. 7, 2022, 2 pages.

*Primary Examiner* — Katy M Ebner
(74) *Attorney, Agent, or Firm* — Withrow & Terranova, PLLC

(57)                    ABSTRACT

An air supplying system for a motor vehicle, comprising an upper air guide and a first lower air guide which are adapted to be installed onboard the motor vehicle and provide flows of cooling air. The upper air guide and the first lower air guide comprise a first portion and a second portion, respectively, which are arranged facing each other with a first air gap defined there between; and at least a first device which is positioned between the first portion of the upper air guide and the second portion of the first air guide and is configured to substantially close the first air gap. The first device includes a deformable portion which is arranged to allow the first device to deform upon a relative movement between the upper air guide and the first lower air guide while keeping the first air gap substantially closed.

15 Claims, 5 Drawing Sheets

(56)     References Cited

U.S. PATENT DOCUMENTS

| | | | | |
|---|---|---|---|---|
| 7,331,413 | B2 * | 2/2008 | Okai | B62D 25/08 |
| | | | | 296/203.02 |
| 11,414,134 | B2 * | 8/2022 | Timofeev | B60K 1/00 |
| 11,529,866 | B2 * | 12/2022 | Tsuji | B60K 11/04 |
| 11,740,034 | B2 * | 8/2023 | Unger | F28D 1/0435 |
| | | | | 165/157 |
| 11,858,334 | B2 * | 1/2024 | Ohlhoff | B60K 11/08 |
| 2002/0023735 | A1 * | 2/2002 | Uchikawa | F28F 9/001 |
| | | | | 165/149 |
| 2007/0243818 | A1 * | 10/2007 | Clarke | B62D 25/084 |
| | | | | 454/320 |
| 2009/0001675 | A1 * | 1/2009 | Higashi | F01P 3/18 |
| | | | | 277/650 |
| 2012/0048633 | A1 * | 3/2012 | Williams | B60K 11/04 |
| | | | | 277/634 |
| 2012/0319363 | A1 * | 12/2012 | Leonard | B60K 11/04 |
| | | | | 277/650 |
| 2013/0220577 | A1 * | 8/2013 | Bignon | F01P 7/02 |
| | | | | 165/98 |
| 2016/0009170 | A1 * | 1/2016 | Schneider | B60K 11/04 |
| | | | | 180/68.1 |
| 2019/0255935 | A1 * | 8/2019 | Tsuji | B60K 11/06 |
| 2019/0270376 | A1 * | 9/2019 | Sedlak | B60K 11/085 |
| 2020/0101817 | A1 * | 4/2020 | Ohlhoff | B60K 11/08 |
| 2021/0129915 | A1 | 5/2021 | Timofeev et al. | |
| 2022/0379965 | A1 * | 12/2022 | Sakamoto | B62D 21/152 |

* cited by examiner

<u>FIG.3</u>

AIR SUPPLYING SYSTEM FOR MOTOR VEHICLES, AND MOTOR VEHICLE, IN PARTICULAR A TRUCK, COMPRISING SUCH AIR SUPPLYING SYSTEM

RELATED APPLICATIONS

The present application claims priority to European Patent Application No. 22168249.5, filed on Apr. 13, 2022, and entitled "AIR SUPPLYING SYSTEM FOR MOTOR VEHICLES, AND MOTOR VEHICLE, IN PARTICULAR A TRUCK, COMPRISING SUCH AIR SUPPLYING SYSTEM," which is incorporated herein by reference in its entirety.

TECHNICAL FIELD

The present disclosure concerns an air supplying system for motor vehicles, and to a motor vehicle, in particular a truck, comprising such an air supplying system.

The air supplying system according to the present disclosure is particularly suitable for being used in trucks or similar type of vehicles and will be described hereinafter by making specific reference to such application, without intending in any way to limit its possible use in other types of motor vehicles.

BACKGROUND

As known, motor vehicles use air supplying systems in order to provide flows of fresh air suitable for cooling the engine of the motor vehicles.

For example, some known trucks use air supplying systems which are associated to and are configured for conveying air flows to the front radiator of a truck.

These known systems usually comprise an upper air guide part, which is mounted on and is movable with the cabin of the truck, and a lower air guide which is usually fixedly connected to the lower part of the truck.

An air gap is formed between the upper air guide and the lower air guide, which may lead to some air escapes; in turn, these air escapes generate undesired turbulences, increase the drag force required to the vehicle, worsen the cooling capabilities, and in the end negatively impact the overall efficiency of the vehicles in terms of fuel consumption.

Thus, the main aim of the present disclosure is to provide a solution able to mitigate, at least partially, one or more of the above mentioned issues.

SUMMARY

Hence, the present disclosure provides an air supplying system for a motor vehicle, comprising:

an upper air guide and at least a first lower air guide which are adapted to be installed on board of the motor vehicle and provide flows of cooling air, wherein said upper air guide and said first lower air guide comprise a first portion and a second portion, respectively, which are arranged facing to each other with a first air gap defined there between;

at least a first device which is positioned, at least in part, between said first portion of the upper air guide and said second portion of the first air guide and is configured to substantially close said first air gap, wherein the first device includes at least one deformable portion which is arranged to allow the first device deforming upon a relative movement between said upper air guide and said first lower air guide while keeping the first air gap substantially closed.

According to some embodiments, the air supplying system for a motor vehicle according to the disclosure may comprise one or more of the following features, which may be combined in any technical feasible combination the first device is configured to close the first air gap in a substantially airtight manner;

the upper air guide and the first lower air guide are adapted to be installed on board of the motor vehicle with said first portion and said second portion substantially aligned to each other in a virtual vertical plan, and wherein said at least one deformable portion is arranged to allow the first device to deform displacing along a substantially vertical axis lying on or parallel to said virtual vertical plan;

the first device is mechanically connected to the first lower air guide;

the first device comprises or is constituted by at least a first bellow forming or incorporating in its body said at least one deformable portion;

the at least a first bellow comprises a base portion adapted to be connected to said second portion of the first lower air guide, an upper portion suitable to be operatively coupled to an associated surface of the first portion of the upper air guide, and an intermediate portion which extends between the base portion and the upper portion and is suitable to be positioned at and close said first air gap;

the upper portion comprises an inclined top surface;

the at least a first bellow comprises corrugated side walls;

the at least a first bellow is made of rubber;

a mounting base which is arranged to be connected at a base portion of the first bellow and to be releasably fastened to the second portion of the first lower air guide;

the mounting base comprises a central opening suitable for allowing flows of air moving into and out from the inside of the first bellow;

the mounting base is made of plastic;

the upper air guide comprises a further side portion and the air supplying system further comprises a second lower air guide having an own portion, said upper air guide and said second lower air guide being mutually arranged with said further side portion and said own portion facing to each other with a second air gap defined there between, and wherein the air supplying system further comprises a second device which is positioned, at least in part, between said further portion of the upper air guide and said own portion of the second lower air guide and is configured to substantially close said first second gap, the second device including at least one deformable portion which is arranged to allow the second device deforming, upon a relative movement between said upper air guide and said second lower air guide, while keeping the second air gap substantially closed.

The present disclosure provides also a motor vehicle comprising an air supplying system which comprises:

an upper air guide and at least a first lower air guide which are adapted to be installed on board of the motor vehicle and provide flows of cooling air, wherein said upper air guide and said first lower air guide comprise a first portion and a second portion, respectively, which are arranged facing to each other with a first air gap defined there between;

at least a first device which is positioned, at least in part, between said first portion of the upper air guide and said second portion of the first air guide and is configured to substantially close said first air gap, wherein the first device includes at least one deformable portion which is arranged to allow the first device deforming upon a relative movement between said upper air guide and said first lower air guide while keeping the first air gap substantially closed.

The present disclosure provides also a truck comprising an air supplying system which comprises:

an upper air guide and at least a first lower air guide which are adapted to be installed on board of the motor vehicle and provide flows of cooling air, wherein said upper air guide and said first lower air guide comprise a first portion and a second portion, respectively, which are arranged facing to each other with a first air gap defined there between;

at least a first device which is positioned, at least in part, between said first portion of the upper air guide and said second portion of the first air guide and is configured to substantially close said first air gap, wherein the first device includes at least one deformable portion which is arranged to allow the first device deforming upon a relative movement between said upper air guide and said first lower air guide while keeping the first air gap substantially closed.

BRIEF DESCRIPTION OF THE DRAWINGS

Further characteristics and advantages will become apparent from the description of some preferred but not exclusive exemplary embodiments of an air supplying system according to the present disclosure, illustrated only by way of non-limitative examples with the accompanying drawings, wherein.

DETAILED DESCRIPTION

Figure 1:
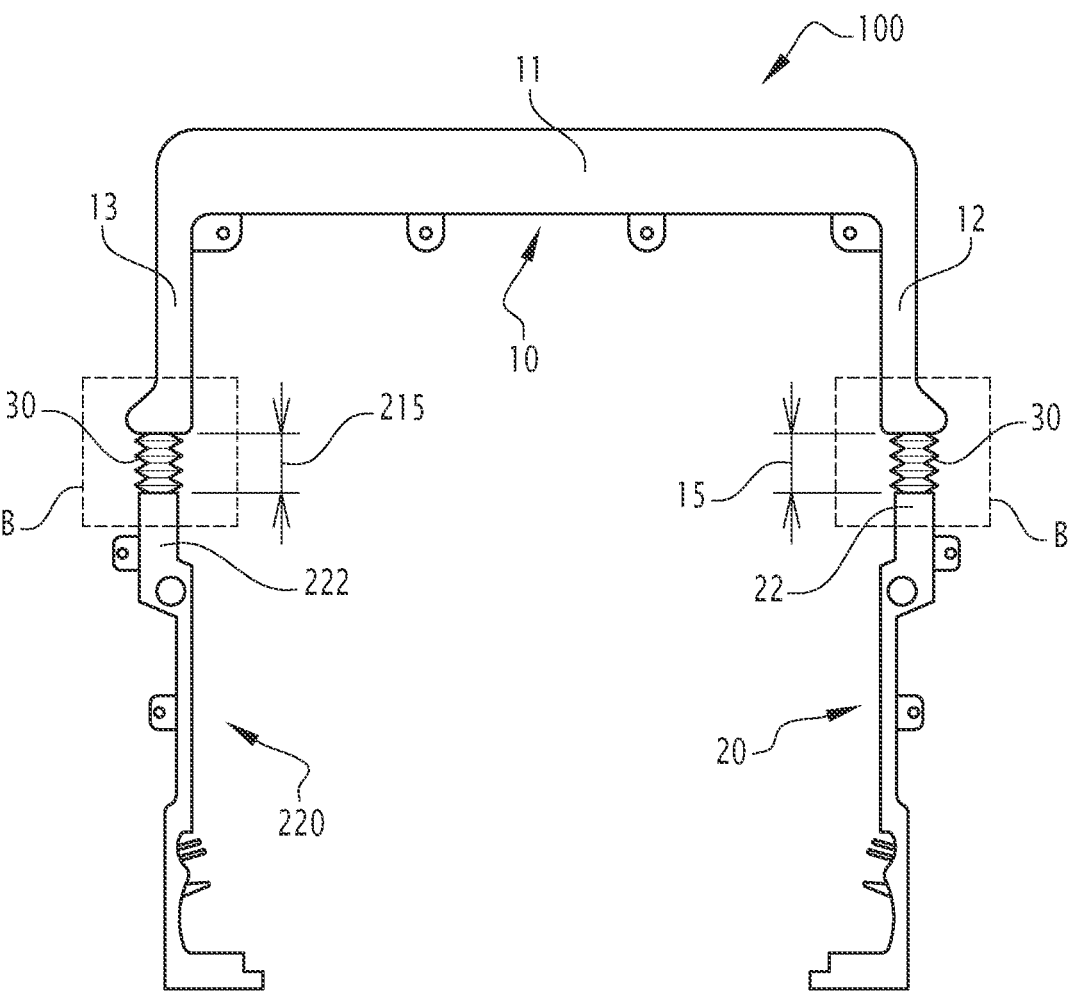
FIG. 1 is a front view schematically representing an air supplying system according to the present disclosure, shown installed around a radiator of a truck.

It should be noted that in the detailed description that follows, identical or similar components, either from a structural and/or functional point of view, may have the same reference numerals, regardless of whether they are shown in different embodiments of the present disclosure; it should also be noted that in order to clearly and concisely describe the present disclosure, the drawings may not necessarily be to scale and certain features of the disclosure may be shown in somewhat schematic form.

Further, when the term "adapted" or "arranged" or "configured" or "shaped", or "set" or any equivalent or similar term is used herein while referring to any component as a whole, or to any part of a component, or to a combination of components, it has to be understood that it means and encompasses correspondingly either the structure, and/or configuration and/or form and/or positioning of the related component or part thereof, or combinations, such term refers to.

In addition, when the term "substantial" or "substantially" is used herein, it has to be understood as encompassing an actual variation of plus or minus 5% with respect to an indicated reference value, or axis, or position, and when the terms transversal or transversally are hereby used, they have to be understood as encompassing a direction non-parallel to the reference part(s) or direction(s)/axis they refer to, and perpendicularity has to be considered a specific case of transverse direction.

Finally, in the following description and claims, the numeral ordinals first, second, et cetera . . . , will be used only for the sake of clarity of description and in no way they should be understood as limiting for whatsoever reason, nor that the order should be necessarily the one described in the illustrated exemplary embodiment(s).

FIG. 1 schematically illustrates an air supplying system 100 for a motor vehicle, such as for instance a truck.

Just for the sake of example, a truck in the form of a semi-trailer tractor is illustrated in FIG. and therein indicated with the reference number 1.

According to know solutions, such truck 1 comprises for example a chassis 2, a cabin 3, and a radiator 4 which is installed at the front of the truck 1.

As illustrated in FIG. 1, the air supplying system 100 according to the disclosure comprises an upper air guide 10 and at least a lower and/or a side air guide 20 which are adapted to be installed on board of the truck 1, for example around the radiator 4 (schematically represented in FIG. 1) and are suitable for providing flows of cooling air, e.g. to be conveyed towards the radiator 4 itself for improving in the end cooling of the engine of the truck 1.

In view of their installation on board of the truck 1, the upper air guide 10 may move relative to the first lower or side air guide 20 or vice versa.

In particular, according to solutions well known in the art or in any case readily available to those skilled in the art and thus not described herein in detail, the upper air guide 10, which can be installed for instance on and solidly movable with the cabin 3, comprises for instance a central portion 11, positioned above the radiator 4, a first side portion 12 and a further side portion 13 which protrude downwardly from the ends of the central portion 11 towards the and at the sides of the radiator 4.

In turn, the at least a lower and/or a side air guide 20 comprises a first lower air guide 20 which can be fixed to the chassis 2 under the upper air guide 20, for example on a side of the radiator 4, and comprises an own portion 22.

As schematically illustrated in FIG. 1, the upper air guide 10 and the first lower air guide are mutually positioned with the respective first side portion 12 and own portion 22 which face to each other with a first air gap 15 defined there between.

As schematically illustrated in FIG. 1, the air supplying system 100 can comprise also a second lower or side air guide 220, substantially identical or very similar to the first lower air guide 20, which is also fixed for instance to the chassis 2 under the upper air guide 20, for example at the opposite side of the radiator 4, and comprises an own portion 222; likewise, the upper air guide and the second lower air guide 220 are mutually positioned with the respective further side portion 13 and own portion 222 which face to each other with a second air gap 215 defined there between.

In the following, for ease of description reference will be made only to the part of the air supplying system 100 at the side including the first lower air portion 20, the first side portion 12 and the first air gap 15.

However, what described hereinafter for this side has to be understood as applicable mutatis mutandis also to the opposite side including the second lower air portion 220, the further side portion 13 and the second air gap 215 formed there between.

Usefully, the air supplying system 100 according to the disclosure comprises at least a first device 30 which is positioned, at least in part, between the first portion 12 of the upper air guide and the own portion 22 (hereinafter referred to as the second portion 22), and is configured to substantially close the first air gap 15.

In particular, the first device 30 includes at least one deformable portion which is arranged to allow the first device 30 itself to deform upon a relative movement between the upper air guide and the first lower air guide 20 while keeping the first air gap 15 substantially closed.

In a possible embodiment, the first device 30 is configured to close the first air gap 15 in a substantially airtight manner, i.e. to substantially prevent air escapes at the first air gap 15.

As illustrated in FIG. 1, the upper air guide 10 and the first lower air guide 20 are adapted to be installed on board of the truck 1 with the respective first portion 12 and second portion 22 substantially aligned to each other in a virtual vertical plan (coinciding with the sheet on which FIG. 1 is depicted), and the at least one deformable portion is arranged to allow the first device 30 to deform displacing along a substantially vertical axis Z lying on or parallel to the virtual vertical plan.

In one possible embodiment, the first device 30 is connected, for instance mechanically, to the first lower air guide 20.

In yet a further possible embodiment, the first device 30 comprises or is constituted by at least a first bellow forming or incorporating in its body said at least one deformable portion, which can be made for instance of rubber.

Figure 2:
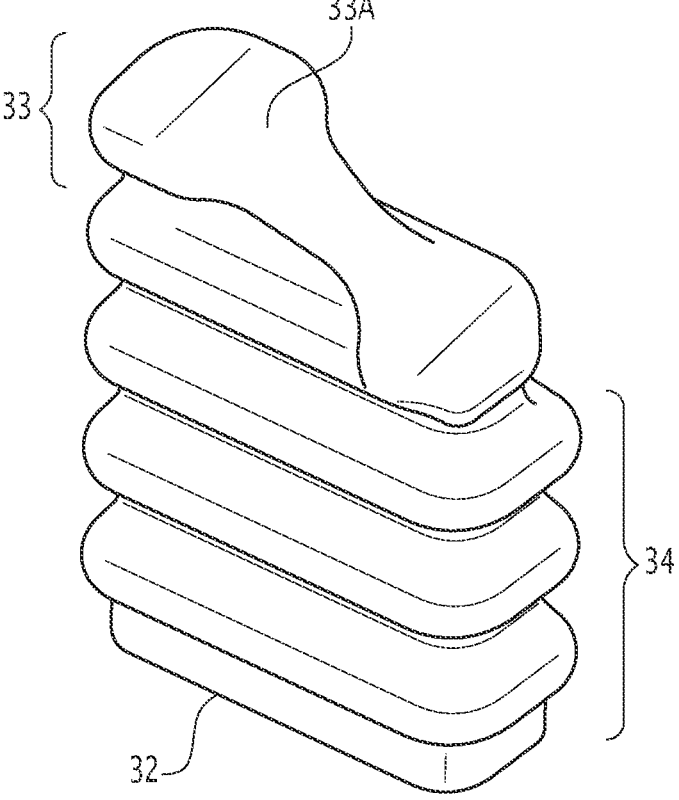
FIG. 2 is an enlarged view of the areas B of FIG. 1.
Figure 3:
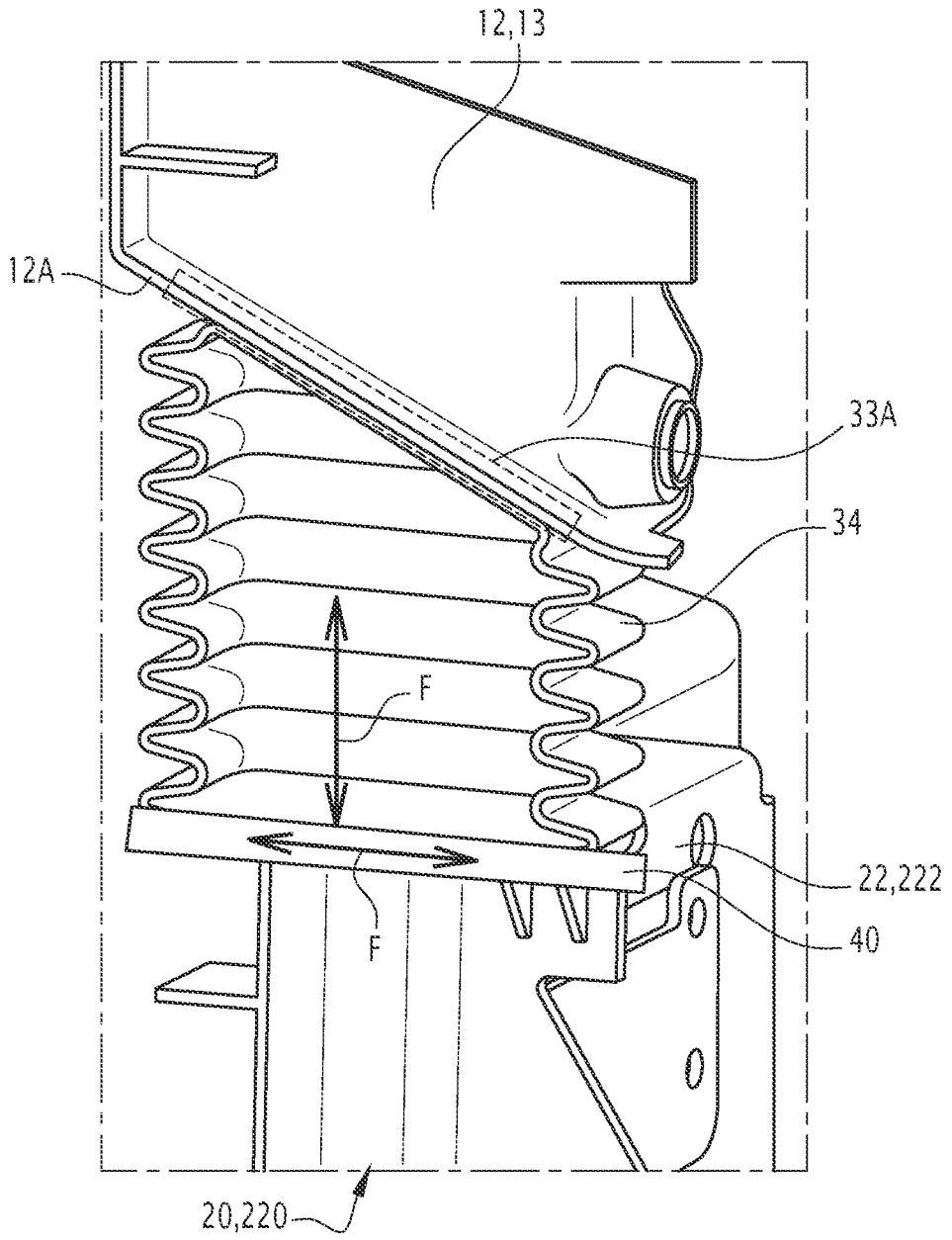
FIG. 3 is a perspective view showing an example of a deformable bellow used in the air supplying system according to the present disclosure.

An exemplary embodiment of such first deformable bellow is illustrated in FIG. 2 and its operative coupling with the first portion 12 and the second portion 22 is illustrated in more details in FIG. 3.

In particular, as illustrated in FIGS. 2 and 3, the first bellow comprises a base portion 32 which is adapted to be connected to the second portion 22 of the first lower air guide 20, an upper portion 33 suitable to be operatively connected to an associated surface 12A of the first portion 12 of the upper air guide 10, and an intermediate portion 34 which extends between the base portion 32 and the upper portion 33 and is suitable to be positioned at and close the first air gap 15.

In the embodiment illustrated in the figures, the first bellow comprises corrugated side walls which favoring its deformation.

As illustrated in more detail in FIG. 2, the upper portion 34 comprises an inclined top surface 33A.

For instance, the upper portion 33, via the top inclined surface 33A, offers a bearing surface on which the surface 12A of the first portion can rest against.

Alternatively, the upper portion 33 can be coupled with the first portion 12 of the upper air guide 10, for example by means of one or more transverse ribs of the first portion 12 entering in corresponding recesses formed by adjacent corrugations of the corrugated side walls.

Figure 4:
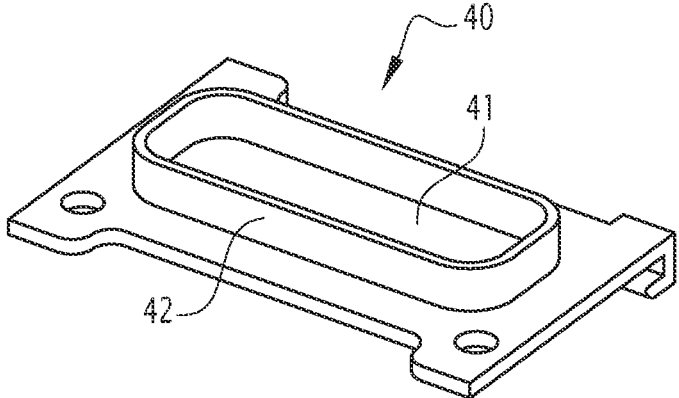
FIG. 4 is a perspective view showing an exemplary mounting base used in the air supplying system according to the present disclosure.
Figure 5:
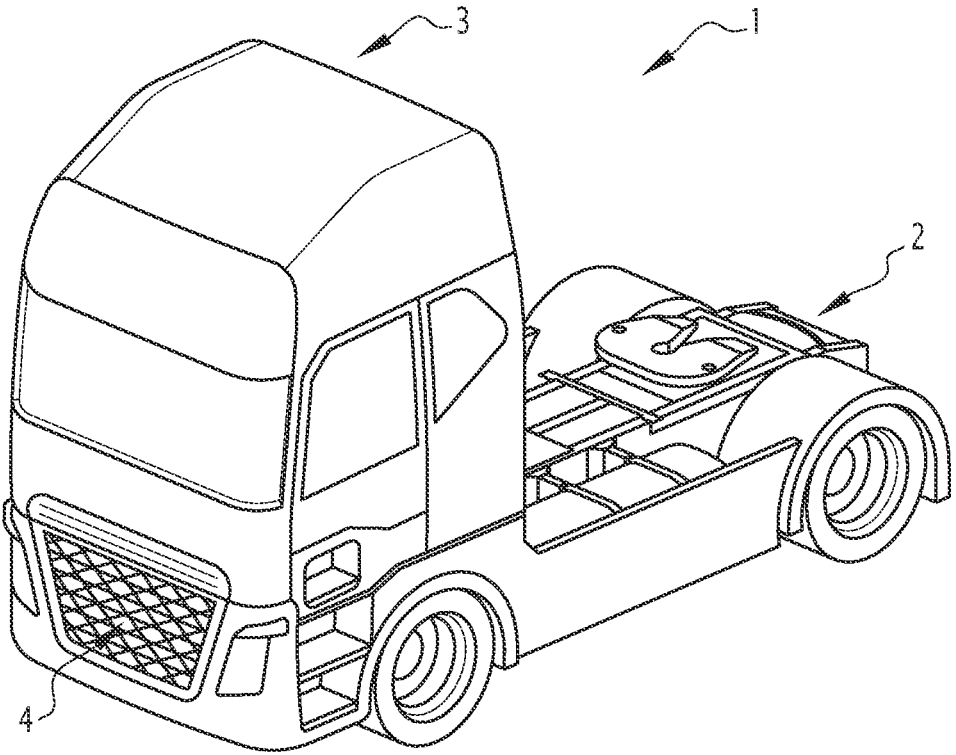
FIG. 5 is a perspective view showing an exemplary truck.

In one possible embodiment, the air supplying system 100 further comprises a mounting base 40, illustrated in FIG. 4, which is arranged to be connected at a base portion 32 of the first bellow and to be releasably fastened to the second portion 22 of the first lower air guide 20, e.g. screwed, as illustrated in FIG. 3.

In the exemplary embodiment illustrated, the mounting base 40 comprises a central opening 41 suitable for allowing flows of air moving into and out from the inside of the first bellow.

Further, the mounting base 40 comprises a rim 42 defined around the border of the opening 41, which protrudes upwardly and is suitable to be coupled with the base portion 32 of the first bellow.

In one possible embodiment, the mounting base 40 is made of plastic.

As previously mentioned, what above described in relation to the side of the air supplying system 100 where the first air gap 15 is formed, can be replicated, substantially in the same way, where the second air gap 215 is defined, i.e. on the other side where there are the further side portion 13 of the upper air guide 10 and the second lower air guide 220 having its own portion 222.

Accordingly, a second device 30, substantially identical to the first device 30, can be installed to substantially close the second gap 215 as well, with its at least one deformable portion arranged to allow the second device 30 itself to deform upon a relative movement between the upper air guide 10 and the second lower air guide 20, while keeping the second air gap 215 substantially closed.

Also in this case, the second device 30 can comprise or be constituted by a further bellow, substantially identical to the first bellow previously described, and a further mounting base 40 can be likewise used.

Hence, it is evident from the foregoing description that the air supplying system 100 according to the present disclosure allows achieving the intended aim and is capable of at least reducing air escapes and thus turbulences. In this way, the aerodynamic behavior is ameliorated, and the cooling efficacy and the fuel consumption efficiency of a motor vehicle are improved.

In fact, the use of the described first device 30 (and second device 30 as well) allows to properly and substantially close an air gap present between the upper and lower guides. In particular, the solution hereby conceived forms a kind of aerodynamic seal which properly works not only in static conditions but also dynamically, e.g. when for example the upper air guide 10 moves relative to the lower air guide 20 (and/or 220), e.g. along the vertical axis Z. In these situations, the capability of deformation of the device(s) 30 allows to "absorb" such a relative movement. For instance, during compression, each device 30 used can take up the load exerted acting as a dynamic damper with the air flows moving as for example illustrated by the arrows F in FIG. 3.

These results are achieved according to a solution very easy to be realized and installed at competitive costs.

The air supplying system 100 thus conceived is susceptible of modifications and variations, all of which are within the scope of the inventive concept as defined in particular by the appended claims. For example, in relation to the specific application, some of the components can be positioned or shaped differently with respect to what previously described, provided that they remain suitable for the scope and tasks devised for them within the frame of the present disclosure; for instance, one or more of the air guides 10, 20 and 220 may be formed by a single piece, or by multiple pieces.

All the details may furthermore be replaced with technically equivalent elements.

The invention claimed is:

1. An air supplying system for a motor vehicle comprising:

a radiator;

an upper air guide and at least a first lower air guide which are adapted to be installed onboard the motor vehicle and provide flows of cooling air toward the radiator, wherein the upper air guide and the first lower air guide comprise a first portion and a second portion, respectively, which are arranged facing each other with a first air gap defined there between; and at least a first device which is positioned, at least in part, between and mechanically coupled to the first portion of the upper air guide and the second portion of the first lower air guide and is configured to substantially enclose the first air gap, the first device positioned along a side of the radiator, wherein the first device includes at least one deformable portion which is arranged to allow the first device to deform upon a relative movement between the upper air guide and the first lower air guide while keeping the first air gap substantially enclosed.

2. The air supplying system of claim 1, wherein the first device is configured to enclose the first air gap in a substantially airtight manner.

3. The air supplying system of claim 1, wherein the upper air guide and the first lower air guide are adapted to be installed onboard the motor vehicle with the first portion and the second portion substantially aligned to each other in a virtual vertical plan, and wherein the at least one deformable portion is arranged to allow the first device to deform displacing along a substantially vertical axis lying on or parallel to the virtual vertical plan.

4. The air supplying system of claim 1, wherein the first device is mechanically connected to at least one of the upper air guide and the first lower air guide.

5. The air supplying system of claim 1, wherein the first device comprises or is constituted by at least a first bellow forming or incorporating in its body the at least one deformable portion.

6. The air supplying system of claim 5, wherein the at least a first bellow comprises a base portion adapted to be connected to the second portion of the first lower air guide, an upper portion suitable to be operatively coupled to an associated surface of the first portion of the upper air guide, and an intermediate portion which extends between the base portion and the upper portion and is suitable to be positioned at and close the first air gap.

7. The air supplying system of claim 6, wherein the upper portion comprises an inclined top surface.

8. The air supplying system of claim 5, wherein the at least a first bellow comprises corrugated side walls.

9. The air supplying system of claim 5, wherein the at least a first bellow is made of rubber.

10. The air supplying system of claim 5, wherein the air supplying system further comprises a mounting base which is arranged to be connected at a base portion of the first bellow and to be releasably fastened to the second portion of the first lower air guide.

11. The air supplying system of claim 10, wherein the mounting base comprises a central opening suitable for allowing flows of air moving into and out from the inside of the first bellow.

12. The air supplying system of claim 10, wherein the mounting base is made of plastic.

13. The air supplying system of claim 1, wherein the upper air guide comprises a further side portion and the air supplying system further comprises a second lower air guide having an own portion, the upper air guide and the second lower air guide being mutually arranged with the further side portion and the own portion facing to each other with a second air gap defined there between, and wherein the air supplying system further comprises a second device which is positioned, at least in part, between the further portion of the upper air guide and the own portion of the second lower air guide and is configured to substantially close the first second gap, the second device including at least one deformable portion which is arranged to allow the second device deforming, upon a relative movement between the upper air guide and the second lower air guide, while keeping the second air gap substantially closed.

14. A motor vehicle comprising the air guide system of claim 1.

15. A truck comprising the air guide system of claim 1.

* * * * *